(12) United States Patent
Lee (10) Patent No.: US 7,725,410 B2
(45) Date of Patent: May 25, 2010

(54) METHOD, APPARATUS AND SYSTEM FOR AIRCRAFT DEICING AND ESTIMATING DEICING COMPLETION TIMES

(75) Inventor: Jonathan Tuan Lee, Cambridge, MA (US)

(73) Assignee: The United States of America as represented by the Secretary of Transportation, Washington, DC (US)

( * ) Notice: Subject to any disclaimer, the term of this patent is extended or adjusted under 35 U.S.C. 154(b) by 205 days.

(21) Appl. No.: 11/398,648

(22) Filed: Apr. 6, 2006

(65) Prior Publication Data

US 2007/0040064 A1 Feb. 22, 2007

Related U.S. Application Data

(60) Provisional application No. 60/709,107, filed on Aug. 18, 2005.

(51) Int. Cl.
*G06F 15/18* (2006.01)
*G06G 7/48* (2006.01)

(52) U.S. Cl. ............................................. 706/14; 703/6

(58) Field of Classification Search .................. 706/14; 703/6
See application file for complete search history.

(56) References Cited

U.S. PATENT DOCUMENTS

| | | |
|---|---|---|
| 4,900,891 A | 2/1990 | Vega et al. |
| 6,920,390 B2 | 7/2005 | Mallet et al. |
| 2002/0128850 A1 | 9/2002 | Chen et al. |
| 2003/0009278 A1 * | 1/2003 | Mallet et al. ................. 701/120 |
| 2004/0054550 A1 | 3/2004 | Cole et al. |
| 2004/0193362 A1 | 9/2004 | Baiada et al. |

OTHER PUBLICATIONS

"TAAM Simulation Study Data Requirements". The Preston Group. Apr. 2000. TAAM Simulation Study Data Requirements.*
"TAAM Plus—Key Requirement Specifications" The Preston Group, Apr. 2000. TAAM Plus—Key Requirements Specification.*
Albrecht, Timothy; "Modeling and Analysis of Aerial Port Operations" Air Force Institute of Technology. Mar. 1999.*
Woller, Joy. "The Basics of Monte Carlo Simulations" 1996.*
Iordanova, Tzveta. "Introduction to Monte Carlo Simulation" Investopedia.*
Jonathan T. Lee et al., "Deicing Decision Support Tool," 23rd Digital Avionics Systems Conference, Salt Lake City, UT, Oct. 24-28, 2004.
Jonathan T. Lee et al., "Detroit Deicing Decision Support Tool,"5th Integrated Communication, Navigation and Surveillance Technologies Conference, Fairfax, VA, May 2-5, 2005.
Jonathan T. Lee et al., "Validation of the DTW De-Icing Model," 24th Digital Avionics Systems Conference, Washington, DC, Oct. 30-Nov. 3, 2005.
Jonathan T. Lee et al., "Deicing Decision Support Tool, Build 2," 50th Annual Conference and Exposition, Grapevine, TX, Oct. 30-Nov. 2, 2005.

* cited by examiner

*Primary Examiner*—David R Vincent
*Assistant Examiner*—Ben M Rifkin
(74) *Attorney, Agent, or Firm*—Wendell Mah (57) ABSTRACT

The overall operating efficiency of processing objects, which are placed in a selected one of several available queues for subsequent processing at respective processing sites, is improved using a model relating the total time for processing to time of waiting in queue and processing. A deicing decision support tool uses the model for estimating completion times for deicing aircraft.

10 Claims, 10 Drawing Sheets

METHOD, APPARATUS AND SYSTEM FOR AIRCRAFT DEICING AND ESTIMATING DEICING COMPLETION TIMES

RELATED APPLICATION

This application claims priority of U.S. provisional application, application No. 60/709,107 filed Aug. 18, 2005, the disclosure of which is hereby incorporated by reference.

TECHNICAL FIELD

The invention relates to aircraft deicing and, more particularly, to a method, apparatus and system for aircraft deicing and estimating deicing completion times so that deicing facilities at busy commercial airports can be efficiently used to ensure minimal disruption to departure flight schedules.

BACKGROUND

Smooth operation of the National Airspace System depends on the ability of flights to take off on time. Deicing is necessary at airports located throughout the northern third of the United States and at airports around the world at comparable latitudes. In these regions, a snowstorm or other cold-weather event can severely disrupt the carefully planned flight schedules at busy airports and impact air travelers throughout the country and around the world. In particular, a storm may cause substantial delays in the departure of flights due to the need for deicing prior to take-off. The extra time needed for an aircraft to be deiced (including waiting time) is extremely difficult to predict.

In general, the deicing process works as follows. An airplane is assigned to a deicing pad to be deiced. A deicing pad has multiple positions where the aircraft can be deiced. The positions can be of different sizes. (Some airports have more than one deicing pad, each containing several deicing positions.) An airplane is driven or towed to the queue of the assigned deicing pad and waits for a sufficiently large position to become available. Once an appropriate position is open, the leading aircraft in the queue taxis into that position. The airplane is then sprayed with a mix of chemicals combined to accomplish the rapid melting of ice, snow, or freezing rain that has accumulated on the aircraft. Moreover, supplementary chemicals may be sprayed to prevent additional accumulation. Once an aircraft is in a deicing position, the time required to spray a particular aircraft is a function of its size, the experienced efficiency of the specific deicing position, the accumulation of ice/snow on the aircraft, and the severity of the snowstorm/weather event.

SUMMARY

The method, apparatus and system of the invention estimate the amount of time an aircraft takes to go through the deicing process, including waiting time, typically in queue, and the actual deicing time, together denoted as the total system time. Some of the variables addressed in this system include aircraft size, size and capacity of each deicing position, the number of deicing positions available in each deicing pad, the number of such pads at the airport, the operational availability of each deicing position, experience-based data on time required at a specific deicing position to deice particular aircraft makes, models, and the number, size and type of aircraft waiting to be deiced. The invention estimates the total system time for each of the deicing pads to which the aircraft can be assigned. This time estimate enables the airport, the airlines, and air traffic controllers to work together to minimize delays and cancellation of flights by optimizing flights at the airport. In the case of the disclosed embodiment, this is done by assigning aircraft to the deicing pad with the shortest estimated total system time.

The time estimate can also be updated continuously as the aircraft waits to be deiced. This information can be displayed directly to the aircraft, for example, by means of a signboard adjacent to the queue, or by radio to the pilots of queued aircraft. Alternatively or additionally, the outputs of the system can be provided to airport, airline, or air traffic control personnel for their use in assigning aircraft to the various deicing pads. In addition, the apparatus or tool of the invention can be used for long-term planning or to provide input to other planning-oriented aviation tools. Simulations can be run on future flight schedules and deicing resources. If the invention predicts excessive delays, additional deicing resources can be allocated to mitigate delay, or flights can be cancelled or delayed to reflect the realistic expectation of departure time. What-if analyses can also be examined. For example, the total system time is highly non-linear and the order of the aircraft in queue can impact the amount of time subsequent aircraft might take to go through the deicing process. What-if analyses can be done on the optimal sequence of flights being queued for a particular deicing pad to minimize the total deicing time for all future flights, instead of just one flight.

These and other features and advantages of the invention will be more apparent from the attached drawings and the detailed description of an example embodiment of the invention.

BRIEF DESCRIPTION OF DRAWINGS

FIGS. 8 and 9 are graphs showing total system time estimates when testing the effect of outbound aircraft type, the results for an outbound B757 being shown in FIG. 9 for comparison with the results in FIG. 8 for an outbound A320 aircraft, both the results for FIGS. 8 and 9 being shown for a type C snow.

FIG. 13 is a flow chart of the operation of the deicing decision support tool and a programmed machine (e.g. a

DETAILED DESCRIPTION

Figure 1:
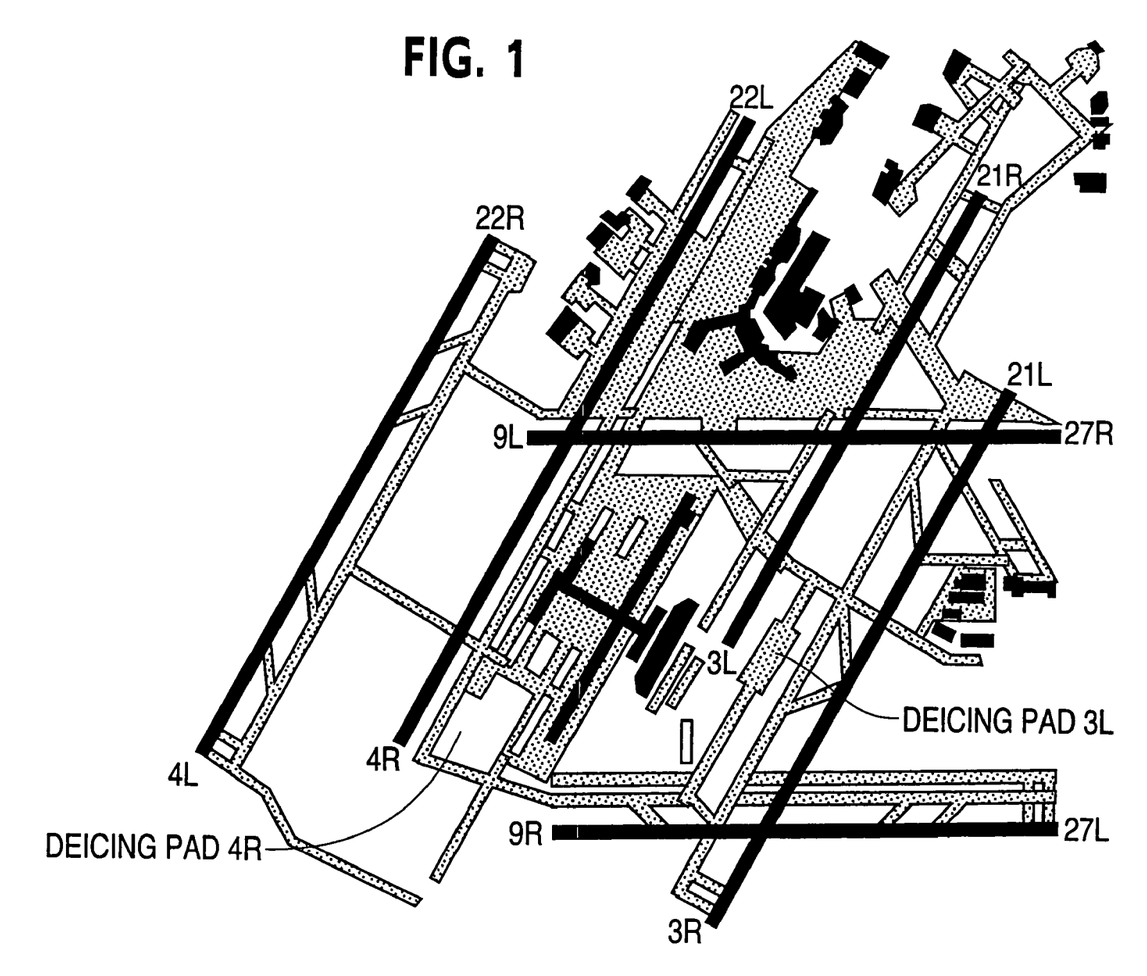
FIG. 1 is a diagram of the Detroit Metropolitan Wayne County Airport (DTW) showing the two deicing pads, 4R and 3L, of the airport.
Figure 5:
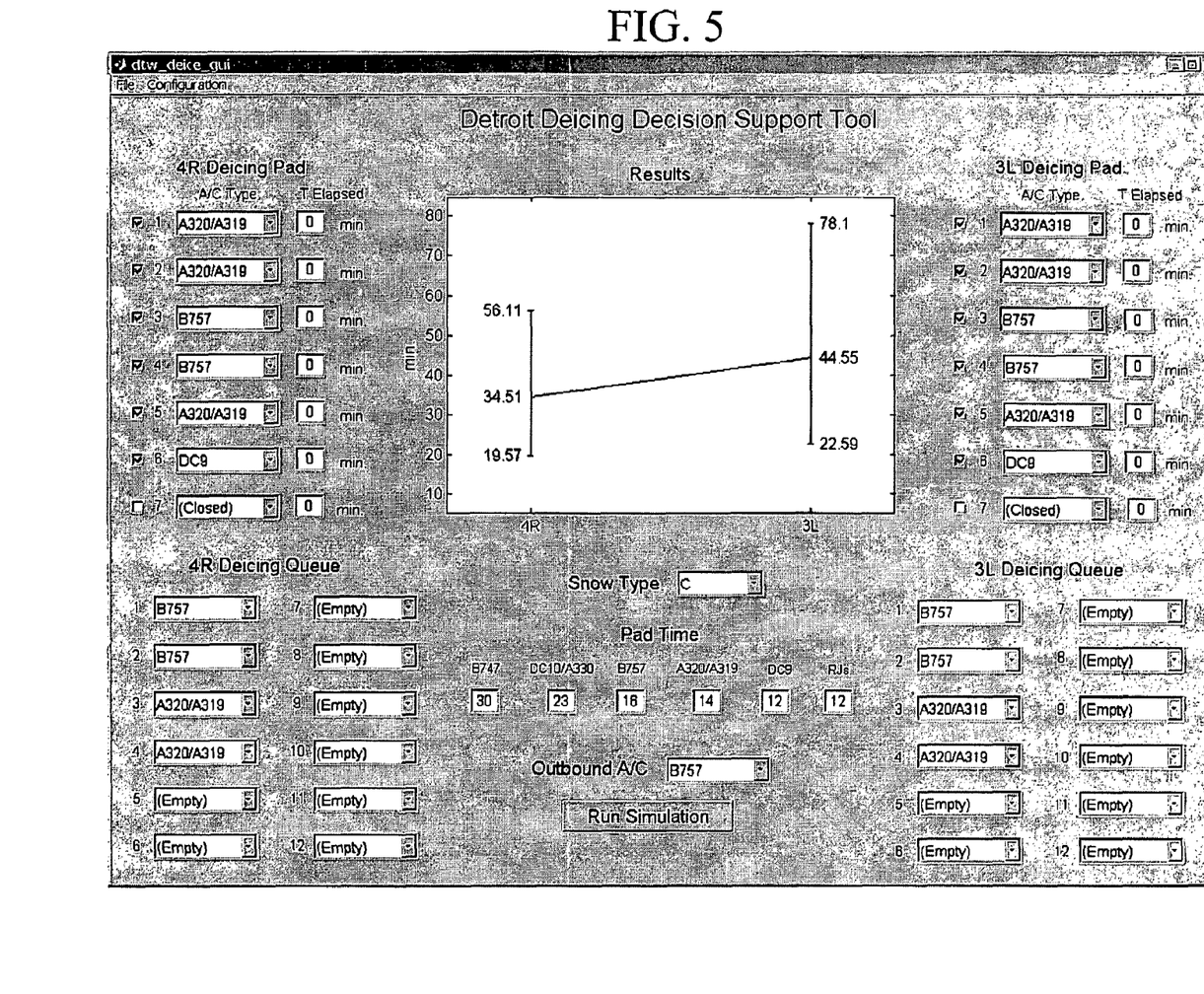
FIG. 5 is a view of a graphical-user-interface of an apparatus of the invention for estimating total system time for deicing, the apparatus being referred to herein as a deicing decision support tool.
Figure 12:
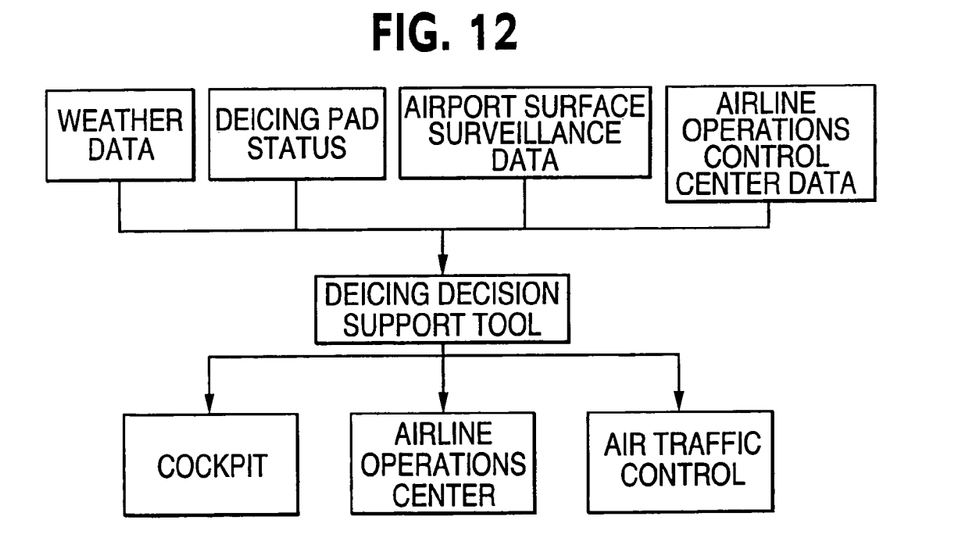
FIG. 12 is a schematic illustration of the deicing decision support tool of the invention showing inputs to and outputs from the tool according to the example embodiment.

The deicing decision support tool or apparatus of the invention is shown in FIGS. 5 and 12. The operation of the tool is described in the flow chart of FIG. 13. The operation of the tool was developed based on a queuing model that was constructed to replicate the deicing process at the two major deicing pads, 4R and 3L in FIG. 1, of Detroit Metropolitan Wayne County Airport. However, the method, apparatus and system of the invention have applicability for different airports and different operational procedures as discussed herein and as will be readily apparent to the skilled artisan.

Deicing Queuing Model

Figure 2:
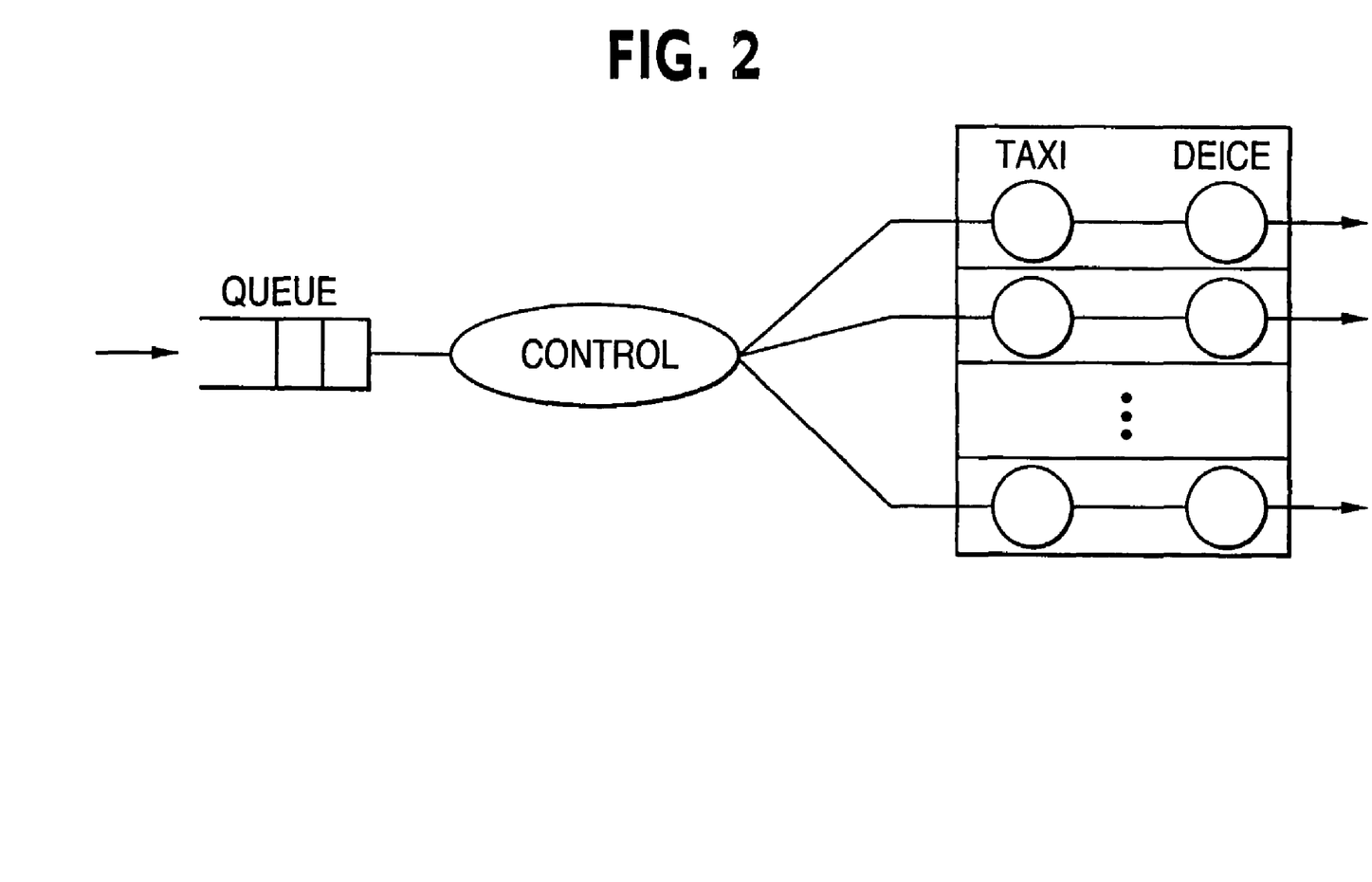
FIG. 2 is a schematic diagram of the deicing queuing model of the invention.

The deicing process often involves four elements, which are represented schematically in FIG. 2. Once an aircraft arrives at the deicing area, it often has to wait in queue until it reaches the head of the queue and a suitable deicing position in the deicing pad is available. (There is only one queue at a deicing pad for all of the deicing positions at that pad.) The queue has a first-come/first-serve policy. If a deicing position is available, the first aircraft in the queue is checked against the position's size constraint, i.e., can the aircraft fit into the open deicing position? The process of checking the size constraint is denoted as "control" in FIG. 2. If the sizing constraint is satisfied, the leading aircraft in the queue taxis into the open deicing position, i.e., the third element of the deicing process. Next, the aircraft is deiced at the deicing position before it taxis out of the deicing position.

The taxi time and deicing time, i.e., the amount of time to taxi into the deicing position and the amount of time to be deiced, respectively, are drawn from probabilistic distributions. The taxi time is sampled from a Gaussian distribution with a mean of 1 minute and a standard deviation (S.D. in Table I) of 10 seconds for all aircraft (all A/C in Table I). Two types of distributions are used for the deicing time. The deicing time is distributed according to a probability distribution if the aircraft is coming from the queue. The mean of the distribution varies according to the type of aircraft and type of snow, as listed in Table 1. Table 2 describes the types of snow. The units of snowfall rate in Table 2 are inches/hour (HR). A Gaussian distribution was initially used for the deicing time. However, based on historical data, the distribution was changed to a lognormal distribution. The standard deviation of deicing time is half a minute for all aircraft types and all snow types. For aircraft already in the deicing positions when the simulation is commenced, an exponential distribution is used with the same mean as in the distribution for the corresponding aircraft and type of snow. Exponential distribution is used to preserve the memoryless property since the amount of time elapsed in the deicing station is not given for aircraft already in the deicing station. The queuing model can also sample deicing time for aircraft already in the deicing positions using Gaussian distribution if the amount of time elapsed in the deicing position is given. The deicing parameters, Table 1, were provided by Northwest Airlines' (NWA) dispatch center at DTW; the snow classification of type A through type E of Table 2 was also obtained from NWA.

TABLE 1

Deicing and Taxiing Parameters (in minutes)

| | Aircraft Model | Mean Time by type of snow | | | | | S.D. All Snow |
|---|---|---|---|---|---|---|---|
| | | A | B | C | D | E | |
| Deice | B747 | 18 | 23 | 30 | 40 | 60 | 0.5 |
| | A330/DC10 | 13 | 18 | 23 | 34 | 45 | |
| | B757 | 8 | 11 | 16 | 20 | 45 | |
| | A319/A320 | 7 | 9 | 14 | 19 | 45 | |
| | DC9 | 3 | 5 | 12 | 15 | 45 | |
| | RJs | 3 | 5 | 12 | 15 | 45 | |
| Taxi | All A/C | | | 1 | | | 1/6 |

TABLE 2

Description of Type of Snow

| A | Frost, freezing fog, or mist, light dry snow less than or equal to ¼"/HR, visibility ½ mile or greater |
|---|---|
| B | Rim ice, light wet snow less than or equal to ¼"/HR, visibility greater than or equal to ½ mile, moderate dry snow ¼ to ¾"/HR visibility greater than ¼ mile |
| C | Moderate wet snow greater than ¾"/HR visibility greater than ¼ mile, heavy dry snow greater than ¾"/HR, visibility less than or equal to ¼ mile |
| D | Heavy wet snow greater than ¾"/HR, visibility less than ¼ mile, light freezing drizzle, visibility less than ½ mile |
| E | Freezing rain: light, moderate, or heavy |

Figure 3:
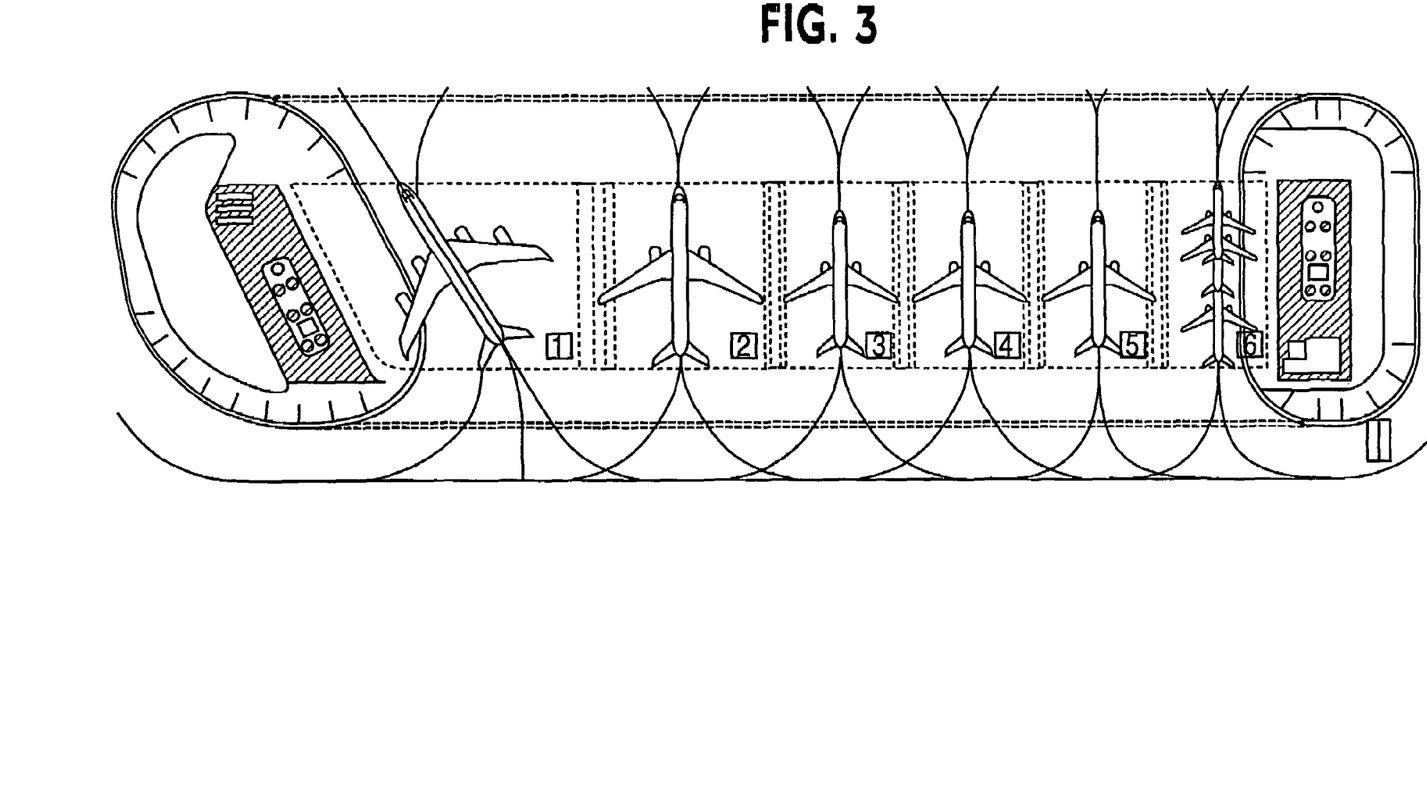
FIG. 3 is a diagram of DTW deicing pad 4R.
Figure 4:
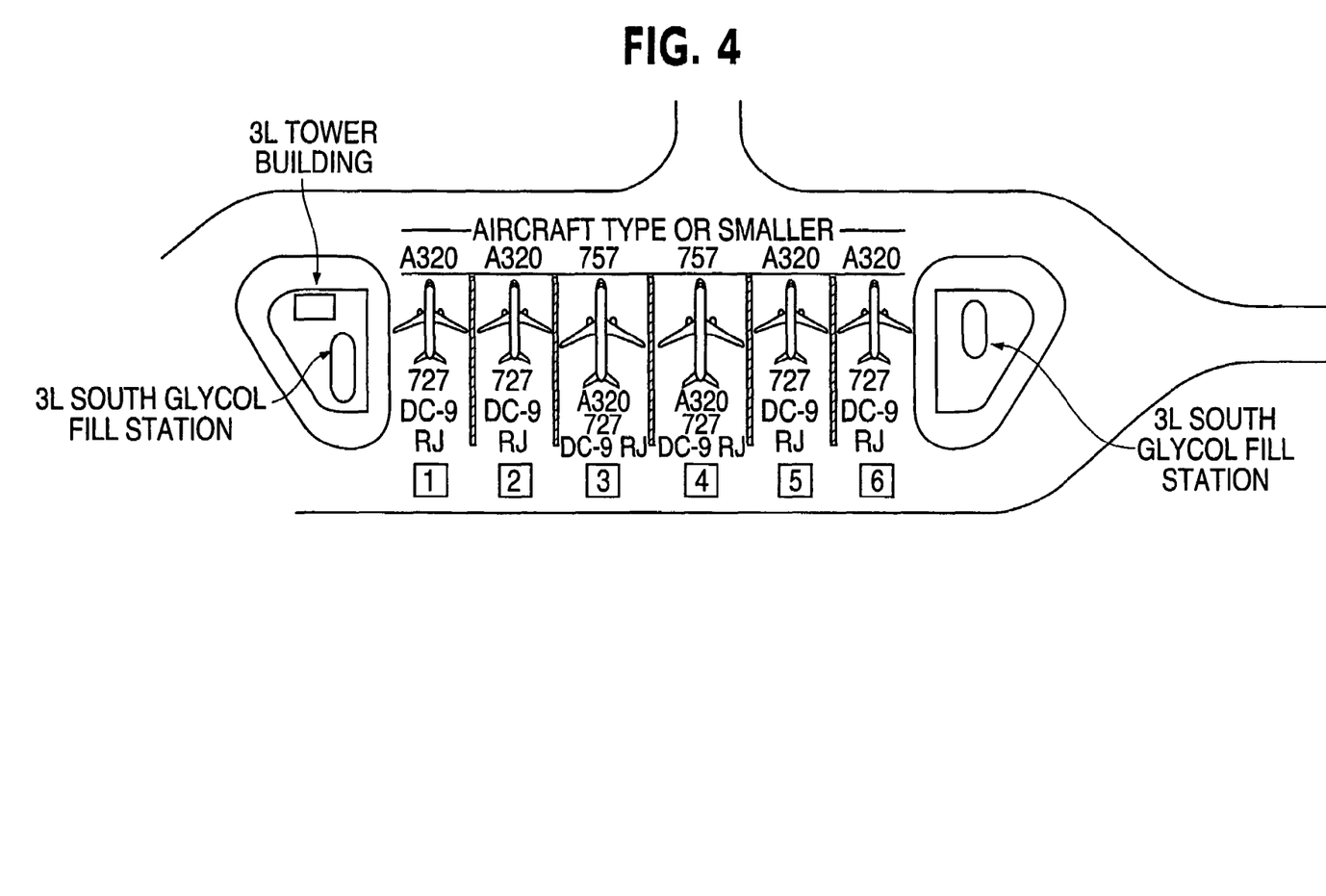
FIG. 4 is a diagram of DTW deicing pad 3L.

In the example embodiment, each of two deicing pads was modeled, i.e., one next to runway 4R and another next to runway 3L (FIG. 3 and FIG. 4, respectively). The size restrictions of the deicing positions of each pad are listed in Table 3 and are inputted into the deicing queuing model. The queuing model for the deicing pads was written in MATLAB®, a high-level programming language and interactive environment produced by The MathWorks of Natick, Mass.

TABLE 3

Maximum Aircraft Size for Deicing Positions At Two DTW Deicing Pads

| | 4R | 3L |
|---|---|---|
| Position 1 | B747† | A320‡ |
| Position 2 | A330† | A320‡ |
| Position 3 | B757‡ | B757‡ |
| Position 4 | B757‡ | B757‡ |
| Position 5 | B757‡ | A320‡ |
| Position 6 | DC9‡ | A320‡ |

†Wide-body aircraft
‡Narrow-body aircraft

Thus, the queuing model can be described as D/M, G-lognormal/m/n. D denotes the deterministic interarrival time for the queue. In fact, the interarrival time is zero since all the aircraft are assumed to be in queue. M represents Markovian service time. That is only true for the aircraft that is already being deiced when the simulation commenced. Otherwise, the server has two serial stages with the following service times for the aircraft in the queue at the beginning of the simulation: Gaussian/normal (G) for taxi and lognormal for the pad time (spray time). (These distributions can be changed if supported by empirical data. Changes can also be adapted to accommodate different airport operational procedures.) The letter m identifies the number of servers in the model. In other words, m is the number of deicing positions in a particular deicing pad. Currently, m is set to be 7 but could be expanded. The letter n represents the storage capacity of the queue, i.e., the maximum number of aircraft allowed in the queue. In the embodiment, n is set to 12.

Deicing Decision Support Tool

Figure 9:
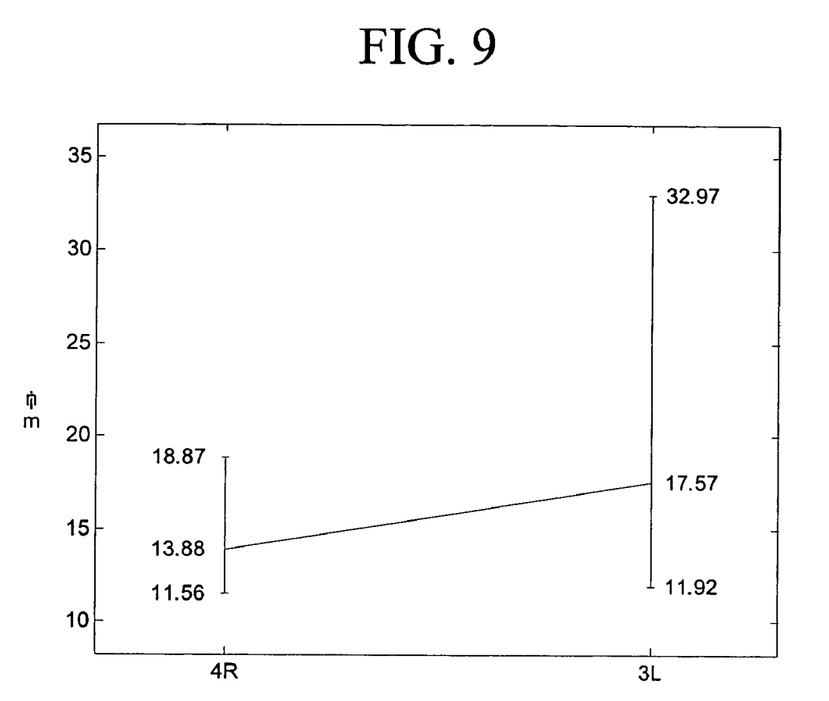
Figure 13:
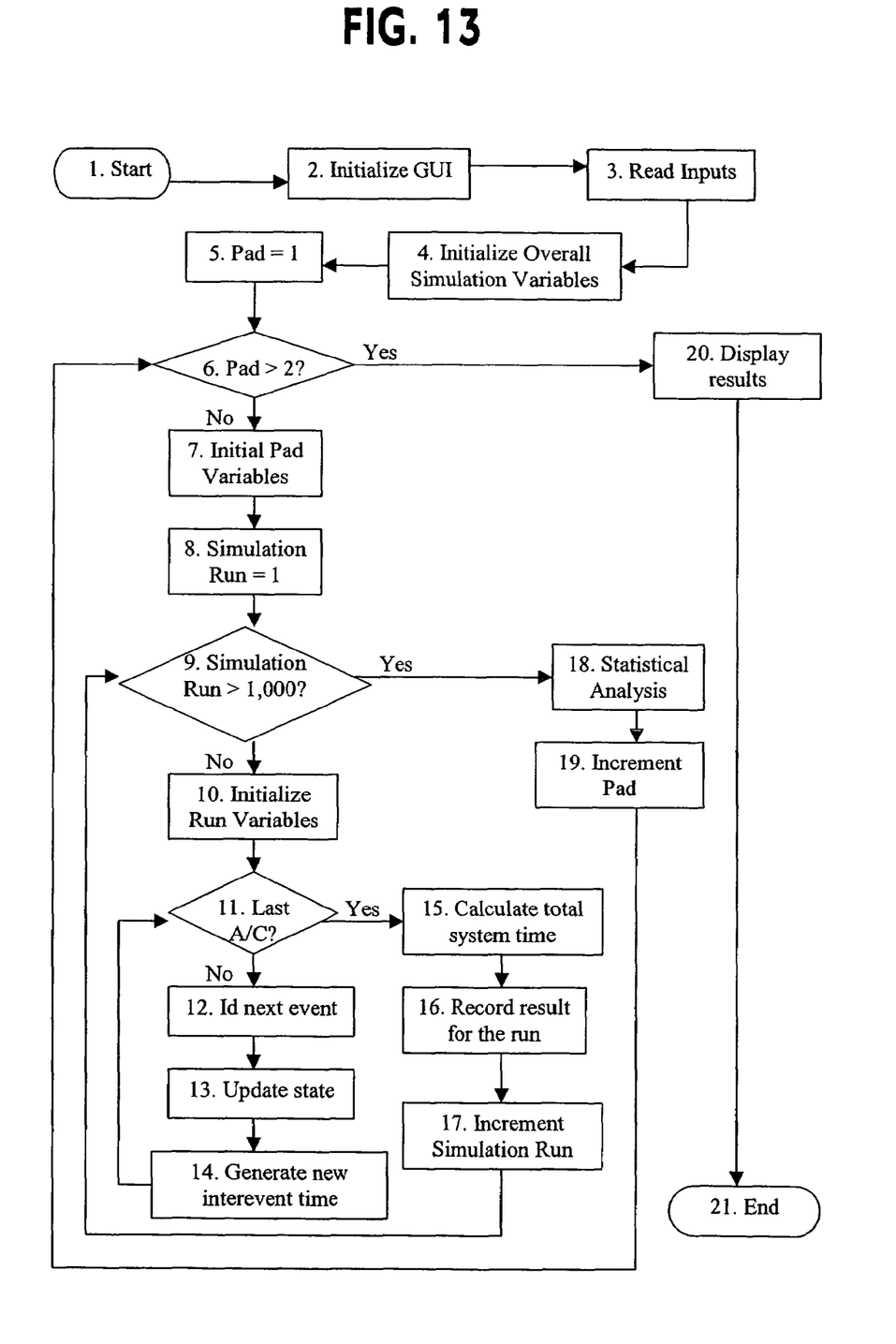

Based on the deicing queuing models built for deicing pads 4R and 3L at the Detroit Metropolitan Wayne County Airport, the deicing decision support tool, FIGS. 12 and 13, was created. The goal of the tool is to give the airline dispatcher or air traffic controller an estimate of the total system time for an outbound aircraft to go through each of the two deicing pads. Therefore, airline dispatchers or air traffic controllers can send the next outbound flight to the deicing pad with the least amount of total system time. A graphical-user-interface to the deicing decision support tool was built (FIG. 5). According to the method of the invention, the user of the tool enters the type of snow, and the make/model of each aircraft already in the deicing pads or in the queues. To facilitate the input process, a pull-down menu was incorporated for entering aircraft makes/models. The outbound aircraft is added to the end of each queue and 1,000 (the default value) simulation runs of the queuing model are performed by the programmed machine of the tool, represented by the box in FIG. 12. The steps of the program are shown schematically in FIG. 13. An estimate for the total system time, along with the 95% confidence interval, for the outbound aircraft going through each of the two queues is estimated based on the Monte Carlo simulation and displayed at display of the graphical-user-interface of the tool. The estimate of the total system time, e.g., 13.88 minutes to go through deicing pad 4R, see values displayed in FIG. 9, is based on the average system time from the 1,000 simulation runs. The end points of the 95% confidence interval are the 97.5 and 2.5 percentiles of the samples from the Monte Carlo simulation, e.g., 18.87 minutes and 11.56 minutes respectively at deicing pad 4R. The sloping line connecting the estimated total system time for the two deicing pads suggests which deicing pad might have a shorter wait time, e.g., deicing pad 4R. The confidence interval attempts to capture the amount of variability in the estimate of the average. Both the estimated total system time and the 95% confidence interval are shown in the graph (FIG. 9).

Various inputs, shown schematically in FIG. 12, are collected for the deicing decision support tool. As referred to above, the weather input would indicate the type of snow that the airport is experiencing. The type of snow will impact the amount of pad/spray time for each aircraft in the deicing pad. The deicing pad status would provide information on which positions within the pad are operational. The airport surface surveillance data would provide the information on types of aircraft in each of the deicing positions as well as in the queue. The Airline Operations Center (AOC) can provide future flight schedules. This information would be relevant for strategic planning purposes, e.g., to allocate the appropriate amount of deicing resources for the next bank of departing flights.

On the output end, the deicing tool can send relevant simulation results to several different parties to better manage the deicing resources. As depicted in FIG. 12, the outputs can be displayed in the cockpit so the pilot knows how much more time he/she needs to wait before takeoff. The outputs from the tool can also be sent to the AOC. Based on the outputs, AOC can match the departure flights to the amount of resources at the deicing pad. For example, if there is excessive wait time at the deicing pad, the AOC can delay the push-back of the departing flights. The output can also be useful to the Air Traffic Control (ATC) personnel. The ATC personnel are responsible for managing the runways at the airport. Knowing the expected time for the aircraft to depart the deicing pad, the ATC personal can plan for the take-off time of the aircraft. Outputs to the various groups can be conveyed using signs, radio, wireline, or other communication means.

The flow chart for the operation of the tool is schematically illustrated in FIG. 13. The steps 1-21 shown in the drawing represent the steps according to the method of the invention of:

1. Start of deicing decision support tool
2. Initialize Graphical User Interface (GUI) of the tool
3. Obtain input variables from GUI
4. Initialize simulation variables
5. Pad=1
6. If Pad>2, exit loop. If not, continue.
7. Initial pad variables
8. Simulation Run=1
9. If Simulation Run>1,000, exit loop. If not, continue.
10. Initialize variables within Monte Carlo simulation, including inter-event time for all feasible events.
11. If last aircraft (A/C) is true, break loop. If not, continue simulation.
12. Identify next event
13. Update state of the simulation
14. Generate new inter-event time
15. Calculate total system time for the last aircraft.
16. Record result from the run
17. Increment simulation run, simulation run+1
18. Perform statistical analysis
19. Increment pad
20. Display results
21. End A number of scenarios were developed to validate the deicing decision support tool. The results of those scenarios are presented below.

Scenario 1: Effect of Oversized Aircraft

Figure 6:
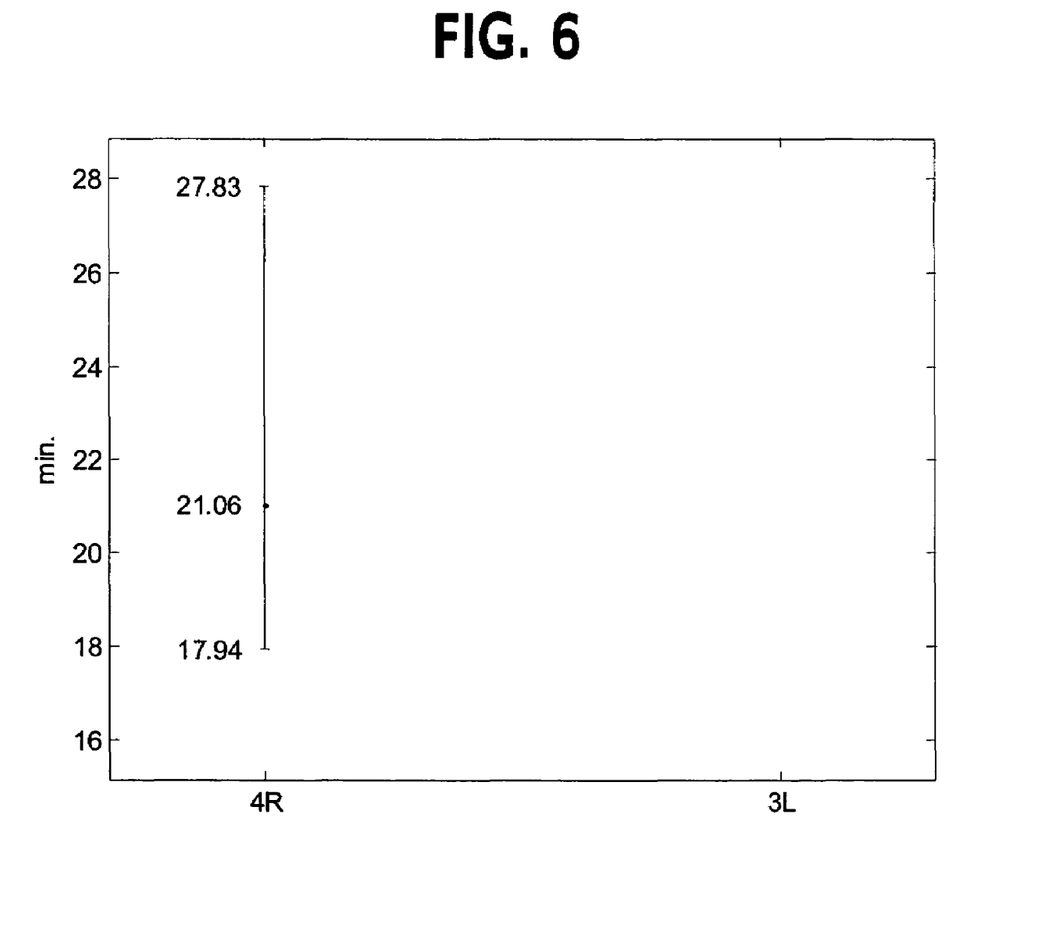
FIG. 6 is a graph showing the estimates for the total system time for oversize aircraft.

Due to the size constraints of the deicing stations in deicing pads 4R and 3L, wide-body aircraft, e.g., B747, A330, and DC10, cannot be deiced in the deicing pad 3L. In this scenario, an outbound A330 was entered with a random stream of aircraft being deiced in the queues of deicing pads 4R and 3L. The graph in FIG. 6 shows the estimates for the total system time for the A330. The graph in FIG. 6 only shows an estimate of the total system time along with the confidence interval for deicing pad 4R; no value for deicing pad 3L is displayed since the wide-body aircraft cannot be deiced at 3L. The only choice to deice the wide-body aircraft is to send it to deicing pad 4R.

Scenario 2: Effect of Snow Event

Figure 7:
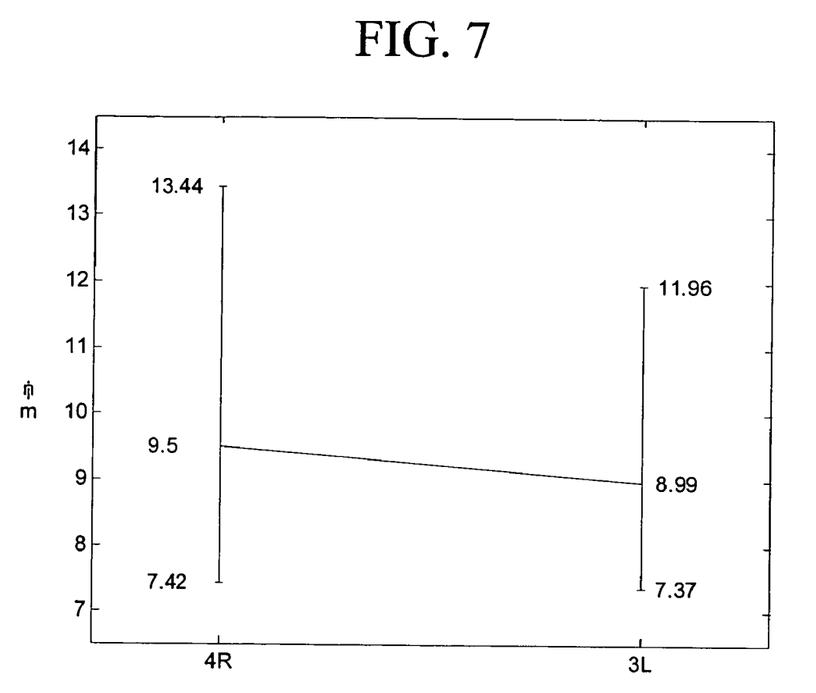
FIGS. 7 and 8 are graphs showing the total system time estimates when testing the effect of snow events, the results for type A snow being shown in FIG. 7 and those for type C snow appearing in FIG. 8.

In this scenario, the effect of the type of snow on the total system time was tested. The make/type of aircraft was set to be identical for both deicing pads, while also satisfying each position's size constraints, in order to enable equal comparison between the two pads. Each pad: A320 in Positions 1, 2, and 5; B757 in Positions 3 and 4; and DC9 in Position 6. There is no aircraft in queue and the outbound aircraft of interest is an A320. Two types of snow events, A and C, were entered. The total system times are shown in FIG. 7 for type A snow and FIG. 8 for type C snow. As the type of snow changed from less severe (A) to more severe (C), the corresponding estimate of the total system time increased due to a lengthier deicing process.

Figure 8:
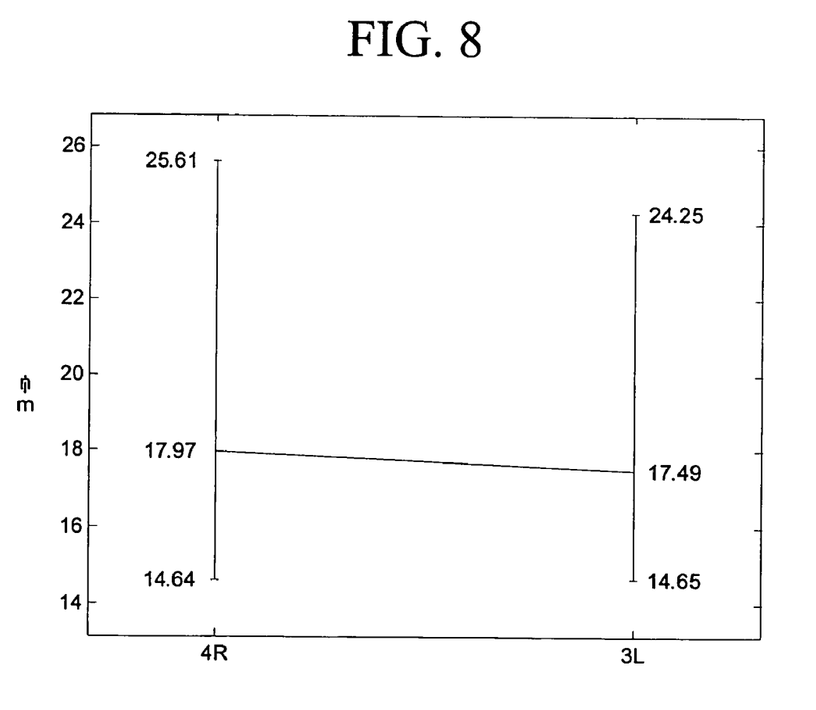

In this scenario, it may be advantageous to send the outbound A320 to deicing pad 3L regardless of the type of snow, since the estimated total system times are shorter for deicing pad 3L in both snow types. The slight differences in the estimate of the total system time between deicing pad 4R and 3L is due to the differences in pad configuration. In 4R, of the six positions, only Positions 1 through 5 can accommodate an A320, whereas all six positions at deicing pad 3L can accommodate an A320. The shortage of one deicing position in deicing pad 4R contributed to the slightly longer estimated total system time.

Scenario 3: Effect of Outbound Aircraft

Scenario 3 tests the effect of different outbound aircraft of interest. Type C snow is used. The make/model of aircraft in the deicing positions was set to be identical for both deicing pads, as in Scenario 2. The outbound aircraft of interest is either an A320 or B757. There is no aircraft in queue. The result for the A320 is shown in FIG. 8, and the result for B757 is shows in FIG. 9.

Neither deicing pad consistently provided shorter estimated total system times for both outbound aircraft types. In case of an outbound A320, it is better to send it to the deicing pad 3L, as explained in Scenario 2. On the other hand, an outbound B757 would be more efficient if it is sent to deicing pad 4R. Once again, this is due to the different physical layouts of the deicing pads. Positions 1 through 5 of deicing pad 4R can accommodate B757; only Positions 3 and 4 of deicing pad 3L can deice a B757. Therefore, this results in a much shorter estimated total system time for the outbound B757 through deicing pad 4R than deicing pad 3L as shown in FIG. 9.

Scenario 4: Effect of Queue Order

Figure 10:
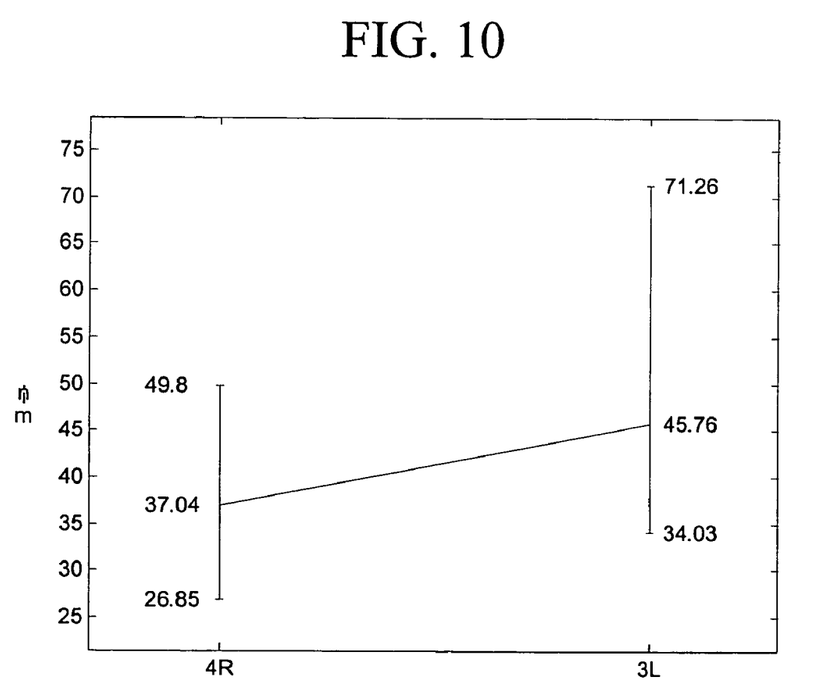
FIGS. 10 and 11 are graphs of estimated total system time showing the effect of queue order, that in FIG. 10 for two B757 aircraft in the front of the queue, and FIG. 11 showing the estimates for two B757 aircraft in the back of the queue.

In Scenario 4, the effect of different queue configurations on the estimated total system time was tested. Once again, the make/type of aircraft in the deicing positions was set to be identical for both deicing pads, as in Scenarios 2 and 3. The snow type is C. The queues for deicing pads 4R and 3L are set to contain the same aircraft. In the first configuration, two B757s are at the front of each queue, followed by two A320s in each queue. In a second configuration, the order is reversed, i.e., there are two A320s in the front of each queue, followed by two B757s in each queue. The outbound aircraft of interest is a B757. The corresponding estimated total system times are shown in FIG. 10 for the first queue and in FIG. 11 for the second queue.

Figure 11:
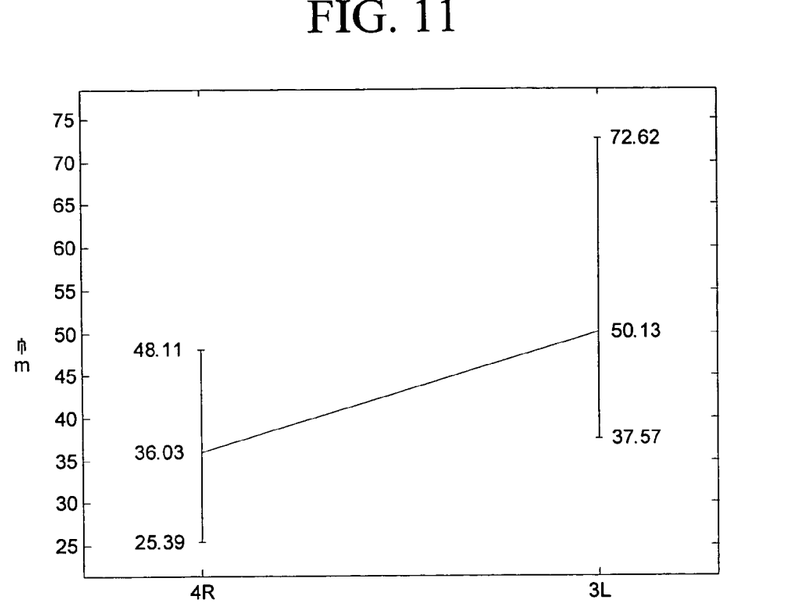

The two different queue configurations would result in similar total system times if the outbound B757 is to go through deicing pad 4R. This is due to the five positions at deicing pad 4R which can accommodate B757. On the other hand, there is a noticeable difference in the total system times associated with the two queue configurations if the outbound B757 is to go through deicing pad 3L. In the first configuration, the two B757s in the front of the queue would hold up all the aircraft behind them while Positions 3 and 4 are not available in deicing pad 3L. During the wait, the smaller deicing positions may become free. Once the B757s at the front of the queue (first configuration) are able to be deiced, there is a higher chance that the A320s can be deiced promptly thereafter, leaving the outbound B757 with a shorter wait. In the second configuration, there is some probability that either or both of Positions 3 and 4 (in deicing pad 3L) would become free first and the A320s in the front of the queue could take either of those open positions. Servicing a relatively small A320 in a large position (Position 3 or 4—each capable of handling a B757) represents an inefficient use of these larger positions. Therefore, the two B757s in the back of the queue (second configuration) would be held up, followed by the outbound B757, which is then added to the end of the queue. Since there are only two B757-capable deicing positions in deicing pad 3L, the two B757s in the back of the queue would take up those positions and further delay the outbound B757 waiting in the queue.

Based upon the above results the queuing model and the deicing support tool are believed to give accurate predictions of total system time.

While the disclosed embodiment of the invention is specific to deicing pads at Detroit Metropolitan Wayne County Airport, the invention can be configured for different airports and different operational procedures. Among the possible improvements or variations for this purpose are:

The number of deicing positions within a deicing pad can be changed to customize the tool for a different airport or as the deicing pad is reconfigured.

The capacity of each deicing position is customizable, that is, the airplane capacity of each deicing position can be entered into the system. The enhancement allows the invention to be customized for a different airport or as deicing pads are reconfigured.

Individual deicing positions can be shut down, for a part of the simulation. The model presently allows for shut-down of individual positions for the entire length of the simulation. This improvement more accurately reflects the deicing operation when only some of the deicing positions are operational during the time of interest.

The number of aircraft slots in queue for the deicing pad can be changed. This enhancement allows the tool to accommodate instances when there are many aircraft waiting to be deiced.

The average estimated total system time needed to accomplish the actual deicing of an aircraft is preferably displayed on the tool as described. This allows the operator to have more accurate knowledge of the parameters used, but other types of displays of the results of the simulation of the model could be employed.

The spray time can be customized by the tool operator. The customized spray time can be for each position and based on recent deicing times, subjective predictions (e.g., experienced efficiency), or other factors. This allows better simulation results.

Wide-body aircraft can be deiced in any two adjacent and open narrow-body deicing positions. This is to reflect rare events when a wide-body aircraft is deiced at a deicing pad instead of the gate area.

Based on the historical data, the distribution and the parameters used for the spray time can be regularly updated. The probability distribution can be changed when indicated.

These and other variations can be made without departing from the scope of the invention as set forth in accompanying claims.

The invention claimed is:

1. A machine-readable medium containing at least one sequence of instructions that, when executed, causes a machine to:

generate a first estimated total system time of a single aircraft including time waiting in a first queue and a first deicing time for a first deicing system to deice the aircraft, under a first set of real-time deicing initial conditions for the single aircraft, including at least weather data for the type of snow, aircraft type of the single aircraft, particular number, type, and order of any aircraft in front of the single aircraft waiting in the first queue, number of deicing positions in the first deicing system, size restrictions of the deicing positions, and any aircraft and type occupying each of the deicing positions, using a first model relating the first estimated total system time to deice the aircraft to the time of waiting in the first queue and the first deicing time; and generate a second estimated total system time of the single aircraft including time waiting in a second queue and a second deicing time for a second deicing system to deice the aircraft, under a second set of real-time deicing initial conditions for the single aircraft, including at least weather data for the type of snow, aircraft type of the single aircraft, particular number, type, and order of any aircraft in front of the single aircraft waiting in the second queue, number of deicing positions in the second deicing system, size restrictions of the deicing positions, and any aircraft and type occupying each of the deicing positions, using a second model relating the second estimated total system time to deice the aircraft to the time of waiting in the second queue and the second deicing time; and wherein said first deicing system includes a first deicing pad having several deicing positions and the first queue for aircraft waiting before a deicing position at the first pad is available, and wherein said first time of waiting includes time in said first queue;

including for an aircraft already in a deicing position of the first deicing pad, utilizing a probability distribution of an amount of time for the aircraft to be deiced for aircraft type and type of snow for generating said first estimated total system time; and wherein said second deicing system includes a second deicing pad having several deicing positions and the second queue for aircraft waiting before a deicing position at the second pad is available, and wherein said second time of waiting includes time in said second queue;

including for an aircraft already in a deicing position of the second deicing pad, utilizing a probability distribution of an amount of time for the aircraft to be deiced for aircraft type and type of snow for generating said second estimated total system time.

2. The machine-readable medium according to claim 1, wherein the first estimated total system time is a statistical characterization of the times obtained from a first Monte Carlo Simulation of the first model, and wherein the first Monte Carlo simulation is run multiple times based on the first set of deicing initial conditions for the single aircraft; and Wherein the second estimated total system time is a statistical characterization of the times obtained from a second Monte Carlo Simulation of the second model, and wherein the second Monte Carlo simulation is run multiple times based on the second set of deicing initial conditions for the single aircraft.

3. A method of estimating completion times for deicing an aircraft in a deicing system wherein the aircraft waits in a queue before being deiced, the method comprising:

generating a first estimated total system time of a single aircraft including time waiting in a first queue and a first deicing time for a first deicing system to deice the aircraft, under a first set of real-time deicing initial conditions for the single aircraft, including at least weather data for the type of snow, aircraft type of the single aircraft, particular number, type, and order of any aircraft in front of the single aircraft waiting in the first queue, number of deicing positions in the deicing system, size restrictions of the deicing positions, and any aircraft and type occupying each of the deicing positions, and using a first model relating the first estimated total system time to deice the aircraft to the first time of waiting and the first deicing time; and generating a second estimated total system time of the single aircraft including time waiting in a second queue and a second deicing time for a second deicing system to deice the aircraft, under a second set of real-time deicing initial conditions for the single aircraft, including at least weather data for the type of snow, aircraft type of the single aircraft, particular number, type, and order of any aircraft in front of the single aircraft waiting in the second queue, number of deicing positions in the deicing system, size restrictions of the deicing positions, and any aircraft and type occupying each of the deicing positions, using a second model relating the second estimated total system time to deice the aircraft to the second time of waiting and the second deicing time; and wherein said first deicing system includes a first deicing pad having several deicing positions and the first queue for aircraft waiting before a deicing position at the first pad is available, and wherein said first time of waiting includes time in said first queue;

including for an aircraft already in a deicing position of the first deicing pad, utilizing a probability distribution of an amount of time for the aircraft to be deiced for aircraft type and type of snow for generating said first estimated total system time; and wherein said second deicing system includes a second deicing pad having several deicing positions and the second queue for aircraft waiting before a deicing position at the second pad is available, and wherein said second time of waiting includes time in said second queue;

including for an aircraft already in a deicing position of the second deicing pad, utilizing a probability distribution of an amount of time for the aircraft to be deiced for aircraft type and type of snow for generating said second estimated total system time.

4. The method according to claim 3, including performing a first Monte Carlo Simulation of the first model, and statistically characterizing the times obtained from the first simulation to obtain said first estimated total system time; and Including performing a second Monte Carlo Simulation of the second model, and statistically characterizing the times obtained from the second simulation to obtain said second estimated total system time.

5. The method according to claim 3, including for an aircraft coming from the first queue of the first deicing pad, utilizing a mean of a probability distribution of an amount of time for the aircraft to be deiced for aircraft type and type of snow for generating said first estimated total system time; and Including for an aircraft coming from the second queue of the second deicing pad, utilizing a mean of a probability distribution of an amount of time for the aircraft to be deiced for aircraft type and type of snow for generating said second estimated total system time.

6. The method according to claim 3, including checking an open deicing position's size constraint to determine whether an aircraft to be deiced can fit into the open deicing position.

7. An apparatus for estimating first and second completion times for deicing a single aircraft, comprising:

means for inputting first and second sets of real-time deicing initial conditions for the single aircraft, each set including at least weather data for the type of snow, aircraft type of the single aircraft, particular number, type, and order of any aircraft in front of the single aircraft waiting in queue, number of deicing positions, size restrictions of the deicing positions, and any aircraft and type occupying each of the deicing positions to a programmed machine; and A programmed machine for receiving:

the first set of real-time deicing initial conditions from said means for inputting, and generating an first estimated total system time for a first deicing system to deice the an aircraft using said first set of deicing initial conditions and a first model relating the first estimated total system time to deice the aircraft to a first time of waiting and deicing; and Wherein said first time of waiting includes time in a first queue of said first deicing system; and wherein for an aircraft already in a deicing position in the first deicing system said programmed machine utilizes a probability distribution of an amount of time for the aircraft to be deiced for aircraft type and type of snow for generating said first estimated total system time; and the second set of real-time deicing initial conditions from said means for inputting and generating a second estimated total system time for a second deicing system to deice the aircraft using said second set of deicing initial conditions and a second model relating the second estimated total system time to deice the aircraft to a second time of waiting and deicing Wherein said second time of waiting includes time in a second queue of said second deicing system; and wherein for an aircraft already in a deicing position in the second deicing system said programmed machine utilizes a probability distribution of an amount of time for the aircraft to be deiced for aircraft type and type of snow for generating said second estimated total system time.

8. The apparatus according to claim 7, wherein said programmed machine performs a first Monte Carlo simulation of the first model and statistically characterizes the time obtained from the first simulation to obtain said first estimated total system time; and wherein said programmed machine performs a second Monte Carlo simulation of the second model and statistically characterizes the time obtained from the second simulation to obtain said second estimated total system time.

9. The apparatus according to claim 7, including means for inputting aircraft type to the programmed machine, and wherein for an aircraft coming from the first queue of the first deicing system said programmed machine utilizes a means of a probability distribution of an amount of time for the aircraft type and type of snow for generating said first estimated total system time; and including means for inputting aircraft type to the programmed machine, and wherein for an aircraft coming from the second queue of the second deicing system said programmed machine utilizes a means of a probability distribution of an amount of time for the aircraft type and type of snow for generating said second estimated total system time.

10. The apparatus according to claim 7, including means for inputting aircraft type to the programmed machine and wherein said programmed machine checks an open deicing position's size constraint to determine whether an aircraft to be deiced can fit into the open deicing position.

* * * * *